US008027776B2

(12) United States Patent
Sawut et al.

(10) Patent No.: US 8,027,776 B2
(45) Date of Patent: Sep. 27, 2011

(54) METHOD FOR EXPERIMENTING ENGINE CONTROLS PARTS

(75) Inventors: Umerujan Sawut, Kanagawa-ken (JP); Shinya Yamaguchi, Kanagawa-ken (JP); Buso Takigawa, Kanagawa-ken (JP)

(73) Assignee: Nikki Co., Ltd., Kanagawa-ken (JP)

( * ) Notice: Subject to any disclaimer, the term of this patent is extended or adjusted under 35 U.S.C. 154(b) by 76 days.

(21) Appl. No.: 12/314,545

(22) Filed: Dec. 12, 2008

(65) Prior Publication Data

US 2009/0216421 A1 Aug. 27, 2009

(30) Foreign Application Priority Data

Feb. 21, 2008 (JP) ................................ 2008-040092

(51) Int. Cl.
*B60T 7/12* (2006.01)

(52) U.S. Cl. ........................................ 701/103; 701/104

(58) Field of Classification Search .................. 701/101, 701/103–105, 110–114

See application file for complete search history.

(56) References Cited

U.S. PATENT DOCUMENTS

| | | | | |
|---|---|---|---|---|
| 4,309,620 | A * | 1/1982 | Bock | 290/4 R |
| 6,170,587 | B1 * | 1/2001 | Bullock | 180/69.6 |
| 7,304,445 | B2 * | 12/2007 | Donnelly | 318/108 |
| 2008/0238108 | A1 * | 10/2008 | Edelson et al. | 290/40 C |

FOREIGN PATENT DOCUMENTS

| | | |
|---|---|---|
| JP | 10-027008 | 1/1998 |
| JP | 2002-206991 | 7/2002 |

* cited by examiner

*Primary Examiner* — John Kwon

(74) *Attorney, Agent, or Firm* — Rader, Fishman & Grauer PLLC

(57) ABSTRACT

Various engine control parts, which are actually attached to the engine and are necessary for engine control, are constructed in a state where electrical transmission and fuel supply are enabled in a manner similar to a case where the engine control parts are mounted on an actual engine, and model-based control is performed using numerical formulas on the same conditions as those of the actual engine on the basis of test data of the actual engine written in an electronic control unit constituting one of the engine control parts.

1 Claim, 1 Drawing Sheet

METHOD FOR EXPERIMENTING ENGINE CONTROLS PARTS

BACKGROUND OF THE INVENTION

1. Field of the Invention

The present invention relates to a method for experimenting or scientifically testing engine control parts capable of testing the performance of various control parts constituting a control system of an engine in various operation states upon being mounted on the engine.

2. Description of the Related Art

Hitherto now, when the air-fuel ratio of an electronic engine is controlled, either maps or feedback control has been used. Instead of this, however, model-based control is recently put into practice as disclosed in, for example, Japanese Patent Application Laid-Open No. 10-27008.

Meanwhile, since the development timings of various engine control parts, such as actuators, which are newly developed for mounting onto an engine, do not necessarily synchronize with each other, it is general that the performance test of the control parts are individually carried out in respective single parts.

Accordingly, when a scientific test was performed with an actual engine system, it could take a long time to carry out a performance test by interaction or the like with other engine control parts. Thus, there was a problem that a development cycle must have been prolonged. Particularly, confirmation of responsiveness or the like at the moment of change in the load or transient response of the engine was very difficult.

Against this problem, a device for testing automobile parts, which tests the performance of various engine control parts constituting an engine system for vehicle mounting by using a simulation tool which reproduces the same state as a case where the parts are practically mounted on an actual vehicle, is suggested as a proposal in Japanese Patent Application Laid-Open No. 2002-206991.

By performing a test by using this simulation tool, the performance of respective parts can be tested under the conditions approximated to those mounted on the actual engine system. However, even in a case where this testing device is used, it is difficult to test the performance of the respective parts in all operation states of the engine. Particularly, since the simulation tool is obtained merely by reproducing, on a desk, the same conditions as those when being mounted on actual equipment, it is not easy to check hardware and software including control performance, such as the responsiveness of an electronic control unit in various operation states of the engine.

SUMMARY OF THE INVENTION

The invention was made to solve the problems as described above, and an object thereof is to provide a method for experimenting engine control parts by which method it is able to eventually control a fuel injection amount according to an engine intake air flow rate or an engine revolution number, and also it is facilitated to carry out a confirmation test of operation in all operation states about the performance of the respective engine control parts, thereby significantly reducing a development cycle of these engine control parts.

The invention made in order to solve the above problems is a method for experimenting engine control parts, in which various engine control parts, which are actually mounted on an engine and are necessary for controlling an engine, are constructed in a state where electrical transmission and fuel supply are made possible in a manner similar to a case where the engine control parts are mounted on an actual engine, and a model-based control is performed on the same conditions as those of the actual engine on the basis of test data of the actual engine written in an electronic control unit that constitutes one of the engine control parts. In this method, when the state equation and output equation which are indicated below are included as numerical formula models of a throttle system used for fuel injection control, engine revolution number control, and air-fuel ratio control to be executed in the electronic control unit, a confirmation test of operation in all operation states can be readily carried out about the performance of the engine control parts on a test device, in regard to an intake system.

$$\begin{bmatrix}\dot{x}_1\\ \dot{x}_2\end{bmatrix} = \begin{bmatrix}x_2\\ a_1x_1 + a_2\mathrm{sign}(x_2) + a_3x_2\end{bmatrix} + \begin{bmatrix}b_1\\ b_2\end{bmatrix}U_a \text{ and,}$$

$$y = x_1$$

where $$a_1 = -\frac{K_s}{J}$$

$$a_2 = -\frac{d_k}{J}$$

$$a_3 = -\left(\frac{D}{J} + \frac{N^2K_tK_e}{R_aJ}\right)$$

$$b_1 = 0$$

$$b_2 = \frac{NK_t}{R_aJ} \text{ and,}$$

y is an observation value.

(where $U_a$ is the input voltage of both ends of an armature, $R_a$ is the resistance of the armature, $K_e$ is an induced voltage constant, N is a gear ratio, J is the total moment of inertia in terms of a throttle axis of a system, D is a viscous frictional coefficient, $d_k$ is Coulomb friction, $K_s$ is the spring constant of a return spring, $K_t$ is a torque constant, $a_1$ to $a_3$ and $b_1$ and $b_2$ are constants, and $x_1$ and $x_2$ are state variables).

Additionally, in the engine control experimenting method, when a numerical formula indicated below are included as numerical formula models of an intake manifold used for fuel injection control, engine revolution number control, and air-fuel ratio control to be executed in the electronic control unit, a confirmation test of operation in all operation states can be easily carried out about the performance of the engine control parts on the test device, in regard to an intake system.

$$\dot{P} = \frac{RT_m}{V}(\dot{m}_a - \dot{m}_c)$$

(where $\dot{m}_a$ is the mass flow rate of the air guided to an intake manifold, $\dot{m}_c$ is an air mass flow rate to a cylinder, R is a gas constant, $T_m$ is the temperature within the intake manifold, and V is the volume of the intake manifold).

Moreover, in the engine control experimenting method, when the state equation and output equation which are indicated below are included as numerical formula models of an engine rotation system used for fuel injection control, engine revolution number control, and air-fuel ratio control to be executed in the electronic control unit, a confirmation test of operation in all operation states can be readily carried out about the performance of engine control parts on the test device, in regard to the engine rotation system.

$$\dot{N} = \frac{30}{J_e \pi}(T_i - T_L)$$

$$T_i = -k_1 + k_2\frac{\dot{m}_c}{N} + k_3\delta + k_4 N\delta - k_5\delta^2 + k_6 N - k_7 N^2 \text{ and,}$$

$$T_L = \beta N^2 + T_d$$

(where N is an engine revolution number, $\dot{m}_c$ is an air mass flow rate to a cylinder, $J_e$ is the moment of inertia of a moving part, $T_i$ is an engine torque, $T_L$ is a load torque, $T_d$ is an accessory torque, $k_1$ to $k_7$ are constants, δ is an ignition timing, and β is a constant)

Furthermore, in the engine control experimenting method, when the state equation and output equation which are indicated below are included as numerical formula models of the whole fuel system used for fuel injection control, engine revolution number control, and air-fuel ratio control to be executed in the electronic control unit, a confirmation test of operation in all operation states can be readily carried out about the performance of engine control parts on the test device, in regard to the fuel system.

$$\begin{bmatrix} \dot{z}_1 \\ \dot{z}_2 \\ \dot{z}_3 \end{bmatrix} = \begin{bmatrix} z_2 \\ w_1 z_2 + w_2 \mathrm{sign}(z_2) + w_3 T_L \\ (\rho Q_i - \rho Q_j - V_p \dot{p} dt)\frac{1}{V_p K_v} \end{bmatrix} + \begin{bmatrix} g_1 \\ g_2 \\ g_3 \end{bmatrix} U_i \text{ and,}$$

$$y = x_3,$$

where $$w_1 = -\left(\frac{D}{J} + \frac{N^2 K_t K_e}{RJ}\right)$$

$$w_2 = -\frac{d_k}{J}$$

$$w_3 = -\frac{1}{J}$$

$$g_1 = 0$$

$$g_2 = \frac{N K_t}{RJ}$$

$$g_3 = 0 \text{ and,}$$

$y = P_f$ is an observation value.

(where $U_i$ is the input voltage of both ends of an armature, $T_L$ is a total load torque, ρ is a fuel density within the piping, $Q_j$ is a fuel injection amount, $V_p$ is a piping volume from a pump outlet to an injector, $K_v$ is a volumetric elastic modulus, $K_e$ is an induced voltage constant, $K_t$ is the torque constant of a motor, N is a gear ratio, J is the total moment of inertia in terms of a throttle axis of a system, D is a viscous frictional coefficient, $d_k$ is Coulomb friction, R is a gas constant, $P_f$ is an injection pressure, $w_1$ to $w_3$ and $g_1$ to $g_3$ are constants, and $z_1$ to $z_3$ are state variables).

By using the numerical formula models according to the present invention, it is able to scientifically test various engine control parts under the same conditions as an actual engine, and to readily test the engine control parts in all operation states. In addition, it is able to check the hardware and software of the electronic control unit, and to significantly reduce a development cycle.

DESCRIPTION OF THE PREFERRED EMBODIMENTS

Figure 1:
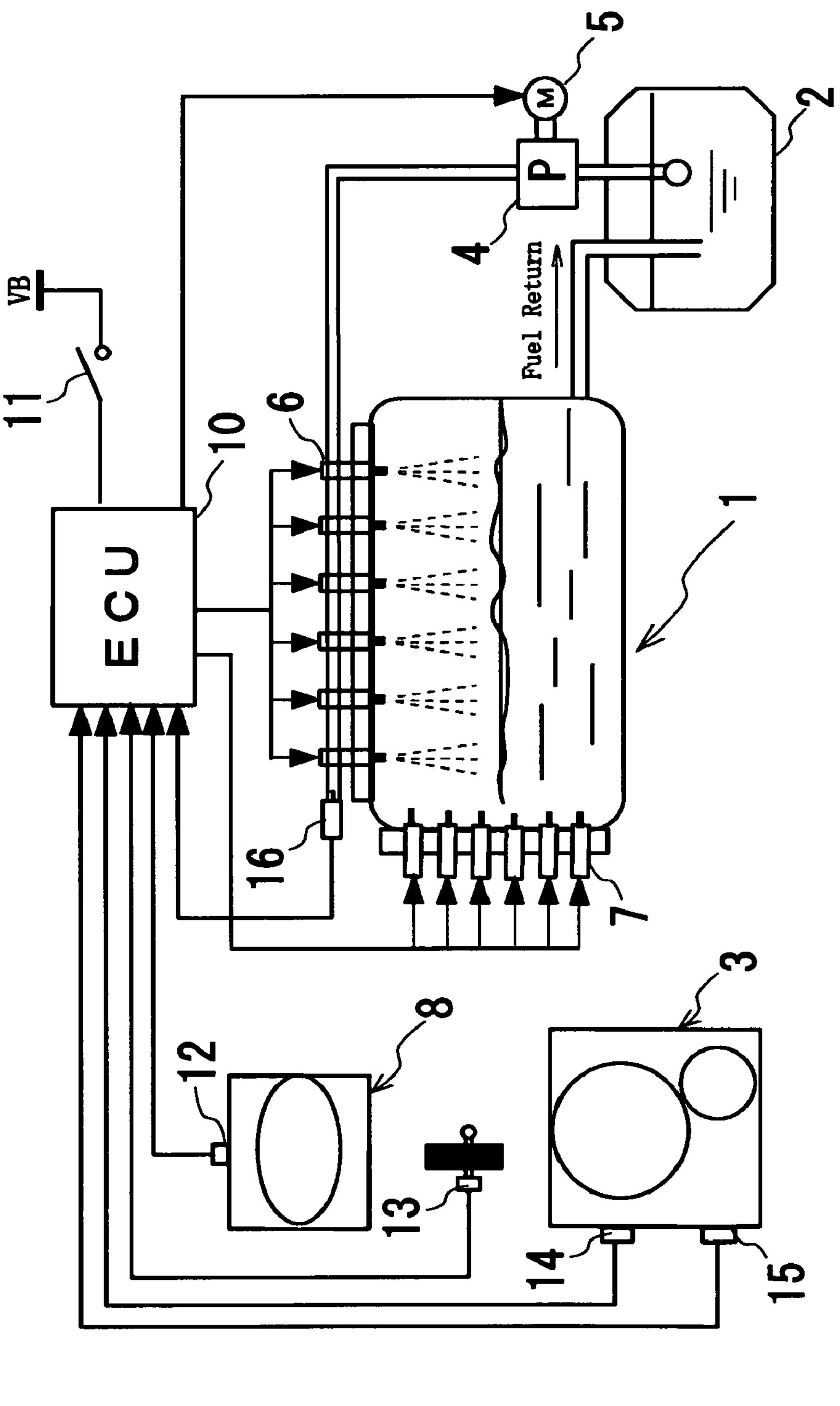
FIG. 1 is a layout drawing of an engine control testing device for carrying out the invention.

Hereinafter, best modes for carrying out the invention will be described with reference to the accompanying drawing.

FIG. 1 is a block diagram illustrating a layout of a test device to be used for an experimenting method according to the present invention. In an engine 1, various engine control parts are constructed in a state where electrical transmission and fuel supply can be achieved in a manner substantially similar to a case where they are mounted on an actual engine. Specifically, an ignition device 7 which has a plurality of ignition plugs and a plurality of injectors 6 are mounted on the engine, and fuel piping which extends from the fuel tank 2 and has a fuel pump 4 disposed on the midway is connected to the injectors 6. Additionally, an electronic control unit 10 that is a fuel injection controller is adapted to control driving of the injectors 6 and a motor 5 of the fuel pump 4 and to control driving of an electronic throttle device 8.

Additionally, an ignition switch 11, a throttle angle sensor 12 annexed to the electronic throttle device 8, an accelerator pedal sensor 13, a crank angle sensor 14 for measuring the number of revolutions of the engine disposed in an engine rotation system 3, a cam sensor 15, and a fuel injection pressure sensor 16 are connected to the electronic control unit 10, and output signals thereof are input to the electronic control unit 10.

The electronic control unit 10 serves as both an engine revolution number controller and an air-fuel ratio controller, while being a fuel injection controller. In addition to the above, however, the electronic control unit 10 constitutes a core of a testing device which carries out a method for testing engine parts which will be described in detail below. A model control program for testing the engine control parts, which makes it possible to test the performance of the engine control parts by using a numerical formula model derived in advance from test data of the actual engine without necessitating actual operation in various operation states, are stored in a storage section of the electronic control unit 10.

In performing an experiment by using this embodiment, when the ignition switch 11 is turned on, first, sensor signals from the throttle angle sensor 12, the accelerator pedal sensor 13, the crank angle sensor 14, the cam sensor 15, and the fuel injection pressure sensor 16 at the moment of engine starting are input to the electronic control unit 10.

Then, in the electronic control unit 10, calculation of the various input sensor signals is performed by using the numerical formula model that is the invention formed on the basis of the test data by actual equipment written in advance in the electronic control unit 10. At this time, information required for engine control, such as an engine revolution number, an engine water temperature, a vehicle speed, a throttle angle, and an air flow rate required for an engine, are calculated as target signals, and fuel injection timing is determined by the information calculated from the numerical formula model. In the electronic control unit 10, control is made such that engine control parts, such as an engine revolution number measuring instrument composed of the crank angle sensor 14 and the cam sensor 15, the electronic throttle device 8, the fuel pump 4, the ignition device 7, and the injectors 6, converge into given target values.

As described above, according to this embodiment, even when the engine is operated under any operating conditions, it can be confirmed that an actual engine revolution number, a throttle angle, and a fuel injection pressure, etc. always converge into designated target values, and thus, it was demonstrated that the present invention is very effective.

Hereinafter, the model-based control by the program in the electronic control unit 10 that is an embodiment of the present invention will be described in detail.

(1) Numerical Formula Model of Intake System:

(a) Numerical Formula Model of Throttle System

A numerical formula model about an electronically controlled throttle system is as follows. First, when the electric properties of a DC motor that is a throttle driving part of the electronic throttle device 8 is discussed, the relationship between current and voltage in an armature of an armature circuit is expressed by the following formula (1) according to the Kirchhoff's law.

$$L\frac{di_a}{dt} + R_a i_a + K_e N\frac{d\theta}{dt} = U_a \tag{1}$$

(where $i_a$ is an armature current, $U_a$ is the input voltage of both ends of the armature, L is inductance of the armature, $R_a$ is the resistance of the armature, $K_e$ is an induced voltage constant, N is a gear ratio, and θ is a throttle angle)

Next, the mechanical properties of the throttle will be discussed. If the generated torque of the motor (T) is defined as $T=NK_t i_a$, the equation of motion of the electronically controlled throttle system is eventually obtained like Formula (2) according to the Newton's law.

$$J\frac{d^2\theta}{dt^2} + D\frac{d\theta}{dt} + d_k \operatorname{sign}\left(\frac{d\theta}{dt}\right) + K_s\theta = NK_t i_a \tag{2}$$

(where J is the total moment of inertia in terms of a throttle axis of the system, D is a viscous frictional coefficient, $d_k$ is Coulomb friction, $K_s$ is the spring constant of a return spring, and $K_t$ is a torque constant)

Also, when it is assumed that a motor current can be controlled without delay (that is, the inductance component L of the armature is negligible), and Formula (1), above is substituted into Formula (2), above Formula (3) is obtained.

$$\ddot{\theta} = -\frac{1}{J}\left(D + \frac{N^2 K_t K_e}{R_a}\right)\dot{\theta} - d_k \operatorname{sign}(\dot{\theta}) - \frac{1}{J}K_s\theta + \frac{NK_t}{R_a J}U_a \tag{3}$$

If state variables are defined as $x_1=\theta$ and $x_2=\dot{\theta}$ in Formula (3), the state equation and output equation of the system are obtained as follows.

$$\begin{bmatrix}\dot{x}_1\\ \dot{x}_2\end{bmatrix} = \begin{bmatrix}x_2\\ a_1x_1 + a_2\operatorname{sign}(x_2) + a_3x_2\end{bmatrix} + \begin{bmatrix}b_1\\ b_2\end{bmatrix}U_a \tag{4}$$

$$y = x_1 \tag{5}$$

In the above state equation, $$a_1 = -\frac{K_s}{J}$$

$$a_2 = -\frac{d_k}{J}$$

$$a_3 = -\left(\frac{D}{J} + \frac{N^2K_tK_e}{R_aJ}\right)$$

$$b_1 = 0$$

$$b_2 = \frac{NK_t}{R_aJ} \text{ and,}$$

y is an observation value.

(where $U_a$ is the input voltage of both ends of an armature, $R_a$ is the resistance of the armature, $K_e$ is an induced voltage constant, N is a gear ratio, J is the total moment of inertia in terms of a throttle axis of a system, D is a viscous frictional coefficient, $d_k$ is Coulomb friction, $K_s$ is the spring constant of a return spring, $K_t$ is a torque constant, $a_1$ to $a_3$ and $b_1$ and $b_2$ are constants, and $x_1$ and $x_2$ are state variables).

(b) Numerical Formula Model of Intake Manifold

The mass flow rate of air which passes through the throttle and is guided to the intake manifold is obtained as follows by a function composed only of a throttle opening, and two functions composed of atmospheric pressure and manifold pressure.

$$\dot{m}_a = f(x_1)g(P) \tag{6}$$

$$f(x_1) = c_1 + c_2x_1 + c_3x_1^2 - c_4x_1^3 \tag{7}$$

$$g(P) = \begin{cases} 1 & \text{if } P \le \frac{P_a}{2} \\ \frac{2}{P_a}\sqrt{PP_a - P^2} & \text{if } \frac{P_a}{2} \le P \le P_a \\ -\frac{2}{P}\sqrt{PP_a - P_a^2} & \text{if } P_a \le P \le 2P_a \\ -1 & \text{if } P \ge 2P_a \end{cases} \tag{8}$$

(where $\dot{m}_a$ is the mass flow rate of the air guided to the intake manifold, $P_a$ is the atmospheric pressure, P is the manifold pressure, and $c_1$ to $c_4$ are constants)

On the other hand, the air mass flow rate from the manifold to a cylinder is calculated like the following formula (9) by the engine revolution number and the manifold pressure.

$$\dot{m}_c = -i_1N - i_2P + i_3NP + i_4NP^2 \tag{9}$$

(where $\dot{m}_c$ is the air mass flow rate to a cylinder, N is the engine revolution number, and $i_1$ to $i_4$ are constants)

Accordingly, the model of the intake system is obtained as follows by a differential equation for the manifold pressure by using Formula (6) and Formula (9).

$$\dot{P} = \frac{RT_m}{V}(\dot{m}_a - \dot{m}_c) \tag{10}$$

(where $\dot{m}_a$ is the mass flow rate of the air guided to an intake manifold, $\dot{m}_c$ is an air mass flow rate to a cylinder, R is a gas constant, $T_m$ is the temperature within the intake manifold, and V is the volume of the intake manifold).

(2) Numerical Formula Model of Engine Rotation System:

The equation of motion of the engine rotation system is expressed by the following formulas.

$$\dot{N} = \frac{30}{J_e \pi}(T_i - T_L) \tag{11}$$

$$T_i = -k_1 + k_2\frac{\dot{m}_c}{N} + k_3\delta + k_4 N\delta - k_5\delta^2 + k_6 N - k_7 N^2 \tag{12}$$

and, $$T_L = \beta N^2 + T_d \tag{13}$$

(where N is an engine revolution number, $\dot{m}_c$ is an air mass flow rate to a cylinder, $J_e$ is the moment of inertia of a moving part, $T_i$ is an engine torque, $T_L$ is a load torque, $T_d$ is an accessory torque, $k_1$ to $k_7$ are constants, $\delta$ is an ignition timing, and $\beta$ is a constant)

(3) Numerical Formula Model of Fuel System:

(a) Numerical Formula Model of Pump Driving Motor

A numerical formula model of the direct-current motor 5 that is a driving part of the fuel pump 4 is given like Formula (14) which is well known conventionally.

$$\ddot{\theta}_p = -\frac{1}{J_a}\left\{\left(D + \frac{N^2 K_t K_e}{R_a}\right)\dot{\theta}_p - d_k \operatorname{sign}(\dot{\theta}_p) - T_L\right\} + \frac{N K_t}{R_a J_a} U_i \tag{14}$$

(where $U_i$ is the input voltage of both ends of the armature, $R_a$ is the resistance of the armature, $K_e$ is an induced voltage constant, N is a gear ratio, $\theta_p$ is a cam rotation angle (pump rotating speed), $J_a$ is the total moment of inertia in terms of a cam axis of the system, D is a viscous frictional coefficient, $d_k$ is Coulomb's constant, $K_t$ is the torque constant of the motor, and $T_L$ is a total load torque)

(b) Numerical Formula Model of Pump Discharge Pressure and Fuel Injection Amount Pump discharge pressure and fuel injection amount are experimentally calculated by the following formulas.

$$\frac{dP_f}{dt} = \left(\rho Q_i - \rho Q_j V_p \frac{dp}{dt}\right)\frac{1}{V_p K_v} \tag{15}$$

$$Q_j = C_n A_n \sqrt{2g\frac{(P_f - P_a)}{\rho}} \tag{16}$$

(where $P_f$ is an injection pressure, $\rho$ is a fuel density within the piping, $Q_j$ is the fuel injection amount, $V_p$ is a piping volume from a pump outlet to an injector, $K_v$ is a volumetric elastic modulus, $C_n$ is an injection flow rate coefficient, $A_n$ is the area of an injection port, and $P_a$ is the atmospheric pressure)

(c) Numerical Formula Model of Whole Fuel System

The total discharge flow rate of the fuel pump 4 is a function of a pump shaft rotating speed. If state variables are defined as $z_1=\theta_p$, $z_2=\dot{\theta}_p$ and $z_3=P_f$, the state equation and output equation of the system are as follows by Formula (14) and Formula (15).

$$\begin{bmatrix} \dot{z}_1 \\ \dot{z}_2 \\ \dot{z}_3 \end{bmatrix} = \begin{bmatrix} z_2 \\ w_1 z_2 + w_2 \operatorname{sign}(z_2) + w_3 T_L \\ (\rho Q_i - \rho Q_j - V_p \dot{\rho} dt)\frac{1}{V_p K_v} \end{bmatrix} + \begin{bmatrix} g_1 \\ g_2 \\ g_3 \end{bmatrix} U_i \tag{17}$$

$$y = x_3 \tag{18}$$

In the above state equation, $$w_1 = -\left(\frac{D}{J} + \frac{N^2 K_t K_e}{RJ}\right)$$

$$w_2 = -\frac{d_k}{J}$$

$$w_3 = -\frac{1}{J}$$

$$g_1 = 0$$

$$g_2 = \frac{N K_t}{RJ}$$

$g_3 = 0$ and, $y = P_f$ is an observation value.

(where $U_i$ is the input voltage of both ends of an armature, $T_L$ is a total load torque, $\rho$ is a fuel density within the piping, $Q_j$ is a fuel injection amount, $V_p$ is a piping volume from a pump outlet to an injector, $K_v$ is a volumetric elastic modulus, $K_e$ is an induced voltage constant, $K_t$ is the torque constant of a motor, N is a gear ratio, J is the total moment of inertia in terms of a throttle axis of a system, D is a viscous frictional coefficient, $d_k$ is Coulomb friction, R is a gas constant, $P_f$ is an injection pressure, $w_1$ to $w_3$ and $g_1$ to $g_3$ are constants, and $z_1$ to $z_3$ are state variables).

The electronic control unit 10 which executes control logics including the above numerical formula models is adapted to be able to accurately execute engine revolution number control, intake air flow rate control, and air-fuel ratio control in addition to the fuel injection control of the engine by using these numerical formula models. From this, the method for testing engine parts of this embodiment makes it possible not only to easily confirm the performance of each part constituting the engine system, but also to simultaneously check the hardware, software and all engine control logics of the electronic control unit 10.

Next, the operation and effects of the controller for engine parts of this embodiment will be described concretely. The object of the method for testing engine parts of the invention is to control the fuel injection amount according to the intake air flow rate or engine revolution number of the engine 1 and to simultaneously confirm the operation of the engine control parts attached to the engine 1, sensors, actuators, the electronic control unit 10, and its control logics, under all the operating conditions.

When the engine is started, at i.e., when the ignition switch 11 is turned on, output signals from the throttle angle sensor 12, the accelerator pedal sensor 13, the crank angle sensor 14, the cam sensor 15, and the fuel injection pressure sensor 16 are input to the electronic control unit 10. The input sensor signals are applied to the above-mentioned numerical formula models of the engine, and are respectively calculated by a CPU.

That is, the engine revolution number, the engine water temperature, the vehicle speed, the throttle angle, and the air flow rate required for the engine, etc. are calculated using these numerical formula models. Then, the engine revolution number, throttle angle, and the like which are calculated are delivered to a normal control sequence as target signals, the injection timing is determined by the information calculated from the models, and control is made such that respective performances of the engine rotation system 3, the electronic throttle device 8, the fuel pump 4, the ignition device 7, the injectors 6, etc. converge on target values.

As a result of having performed a test by using the method for testing engine parts of this embodiment, even if the engine 1 is under any operating conditions, it can be confirmed that the engine revolution number, the throttle angle, the fuel injection pressure, and other detection values always converge into designated target values and that various engine control parts or the hardware and software of the electronic control unit 10 function correctly.

As described above, it becomes possible to simultaneously confirm the performance of the engine control parts, the hardware and software of the electronic control unit, and all the engine control logics by using the numerical formula models that are this embodiment.

What is claimed is:

1. A method for experimenting engine control parts, wherein various engine control parts, which are actually attached to an engine and are necessary for engine control, are constructed in a state where electrical transmission and fuel supply are enabled in a manner similar to a case where the engine control parts are mounted on an actual engine, and model-based control is performed using numerical formulas indicated below on the same conditions as those of the actual engine, on the basis of experimental data of the actual engine written in an electronic control unit constituting one of the engine control parts, $$\begin{bmatrix} \dot{x}_1 \\ \dot{x}_2 \end{bmatrix} = \begin{bmatrix} x_2 \\ a_1 x_1 + a_2 \text{sign}(x_2) + a_3 x_2 \end{bmatrix} + \begin{bmatrix} b_1 \\ b_2 \end{bmatrix} U_a$$

$$y = x_1$$

In the above state equation, $$a_1 = -\frac{K_s}{J}$$

$$a_2 = -\frac{d_k}{J}$$

$$a_3 = -\left(\frac{D}{J} + \frac{N^2 K_t K_e}{R_a J}\right)$$

$$b_1 = 0$$

$$b_2 = \frac{N K_t}{R_a J} \text{ and,}$$

y is an observation value, (where $U_a$ is the input voltage of both ends of an armature, $R_a$ is the resistance of the armature, $K_e$ is an induced voltage constant, N is a gear ratio, J is the total moment of inertia in terms of a throttle axis of a system, D is a viscous frictional coefficient, $d_k$ is Coulomb friction, $K_s$ is the spring constant of a return spring, $K_t$ is a torque constant, $a_1$, to $a_3$ and $b_l$ and $b_2$ are constants, and $x_1$ and $x_2$ are state variables).

* * * * *

UNITED STATES PATENT AND TRADEMARK OFFICE

CERTIFICATE OF CORRECTION

PATENT NO. : 8,027,776 B2
APPLICATION NO. : 12/314545
DATED : September 27, 2011
INVENTOR(S) : Umerujan Sawut et al.

It is certified that error appears in the above-identified patent and that said Letters Patent is hereby corrected as shown below:

Title Page, Item (54) and at Column 1, lines 1 and 2, title should read:
-- METHOD FOR EXPERIMENTING ENGINE CONTROL PARTS --.

Signed and Sealed this
Tenth Day of January, 2012

David J. Kappos
*Director of the United States Patent and Trademark Office*